(12) United States Patent
Lu

(10) Patent No.: US 8,685,288 B2
(45) Date of Patent: Apr. 1, 2014

(54) SOLID-SOLUTION METHOD FOR PRODUCING IRON-CONTAINING ACTIVE MATERIALS FOR RECHARGEABLE OXIDE-ION BATTERY CELLS

(75) Inventor: Chun Lu, Sewickley, PA (US)

(73) Assignee: Siemens Aktiengesellschaft, München (DE)

( * ) Notice: Subject to any disclaimer, the term of this patent is extended or adjusted under 35 U.S.C. 154(b) by 282 days.

(21) Appl. No.: 13/346,780

(22) Filed: Jan. 10, 2012

(65) Prior Publication Data
US 2013/0175483 A1     Jul. 11, 2013

(51) Int. Cl.
*H01B 1/02*     (2006.01)
*H01M 4/52*    (2010.01)

(52) U.S. Cl.
USPC ...... 252/513; 252/518.1; 429/221; 423/593.1

(58) Field of Classification Search
CPC .............. H01B 1/02; H01B 1/16; H01B 5/00; H01M 4/362; H01M 4/52; H01M 2004/021
USPC ................ 252/513, 518.1; 429/221; 423/138, 423/593.1; 428/469, 539.5
See application file for complete search history.

(56) References Cited

U.S. PATENT DOCUMENTS

| 3,896,049 A * | 7/1975 | Dworak .......................... 502/336 |
| 4,054,729 A | 10/1977 | Isenberg |
| 6,071,650 A * | 6/2000 | Harada et al. ................. 429/235 |
| 6,261,720 B1 * | 7/2001 | Kimiya et al. ................ 429/223 |
| 6,399,247 B1 | 6/2002 | Kitayama et al. |
| 7,396,612 B2 | 7/2008 | Ohata et al. |
| 2010/0243964 A1 * | 9/2010 | Lee et al. ...................... 252/503 |
| 2011/0033769 A1 | 2/2011 | Huang et al. |

OTHER PUBLICATIONS

Chun Lu and Kevin P. Litzinger, U.S. Appl. No. 13/167,900, filed Jun. 24, 2011, entitled "Construction of Planar Rechargeable Oxide-Ion Battery Cells and Stacks Using Stainless Steel Housing Structures."

* cited by examiner

*Primary Examiner* — Mark Kopec

(57) ABSTRACT

The present invention describes a solid-solution synthesis method for producing porous Fe-containing active material (74) wherein Fe is interwoven with supporting oxide(s) by the following steps: mixing (64) Fe-containing specie ($\alpha$) (60) and a supporting specie ($\beta$) (62) containing element of X, to provide a mixture (66), high-temperature treatment (68) to provide a Fe—X—O solid solution (70), and reducing (72) the solid solution to provide the Fe-containing active material wherein Fe is interwoven with X oxide(s) (74).

12 Claims, 6 Drawing Sheets

Path 1: $Me + xO^{2-} \Longleftrightarrow MeO_x + 2xe^-$

Path 2: $xO^{2-} \Longleftrightarrow x/2 O_{2(g)} + 2xe^-$
$x/2 O_{2(g)} + Me \Longleftrightarrow MeO_x$ $x/2 O_{2(g)} + 2xe^- \Longleftrightarrow xO^{2-}$

SOLID-SOLUTION METHOD FOR PRODUCING IRON-CONTAINING ACTIVE MATERIALS FOR RECHARGEABLE OXIDE-ION BATTERY CELLS

BACKGROUND OF THE INVENTION

1. Field

This present invention relates to a synthesis method for producing iron-containing active materials capable of retaining its surface area at high temperature and to be used in the metal electrode of rechargeable oxide-ion battery (ROB) cells.

2. Description of Related Art

Electrical energy storage is crucial for the effective proliferation of an electrical economy and for the implementation of many renewable energy technologies. During the past two decades, the demand for the storage of electrical energy has increased significantly in the areas of portable, transportation, load-leveling and central backup applications.

The present electrochemical energy storage systems are simply too costly to penetrate major new markets. Higher performance is required, and environmentally acceptable materials are preferred. Transformational changes in electrical energy storage science and technology are in great demand to allow higher and faster energy storage at lower costs and longer lifetimes necessary for major market enlargement. Most of these changes require new materials and/or innovative concepts, with demonstration of larger redox capacities that react more rapidly and reversibly with cations and/or anions.

Batteries are by far the most common form of storing electrical energy, ranging from: standard every day lead-acid cells; nickel-metal hydride (NiMH) batteries, taught by Kitayama in U.S. Pat. No. 6,399,247 B1; metal-air cells taught by Isenberg in U.S. Pat. No. 4,054,729, to the lithium-ion battery taught by Ohata in U.S. Pat. No. 7,396,612 B2. Most of these latter battery cells require liquid electrolyte systems.

Batteries range in size from button cells used in switches, to megawatt load leveling applications. They are, in general, efficient storage devices, with output energy typically exceeding 90% of input energy, except at the highest power densities.

Rechargeable batteries have evolved over the years from lead-acid through nickel-cadmium and nickel-metal hydride (NiMH) to lithium-ion batteries. NiMH batteries were the initial workhorse for electronic devices such as computers and cell phones, but they have almost been completely displaced from that market by lithium-ion batteries because of the latter's higher energy storage capacity. Today, NiMH technology is the principal battery used in hybrid electric vehicles, but it is likely to be displaced by the higher power energy and now lower cost lithium batteries, if the latter's safety and lifetime can be improved. Of the advanced batteries, lithium-ion is the dominant power source for most rechargeable electronic devices.

What is needed is a dramatically new electrical energy storage device that can easily discharge and charge a high capacity of energy quickly and reversibly, as needed. What is also needed is a device that can operate for years without major maintenance. What is also needed is a device that does not need to operate on natural gas, hydrocarbon fuel or its reformed by-products such as $H_2$. One possibility is a rechargeable oxide-ion battery (ROB), as set out, for example, in U.S. application Ser. No. 13/167,900, filed Jun. 24, 2011, and U.S. Patent Publication No. 2011/0033769 A1 (Huang et al.).

A ROB essentially is an oxygen-concentration cell, and it comprises a metal electrode, an oxide-ion conductive electrolyte, and an air cathode. The metal electrode undergoes reduction-oxidation cycles during charge and discharge processes for energy storage. The working principles of a rechargeable oxide-ion battery cell 10 are schematically shown in FIG. 1. In discharge mode, oxygen molecules are electrochemically reduced into oxide ions on air electrode 12 by the cathodic reaction of $x/2O_2 + 2xe^- \rightarrow xO^{2-}$. The oxide ions migrate from the air electrode (high oxygen partial pressure side) to the metal electrode (14, low oxygen partial pressure side) through the electrolyte 16 under the driving force of gradient oxygen chemical potential. In principle, there exist two possible reaction mechanisms to oxidize the metal. One of them, solid-state diffusion reaction designated as Path 1, is that oxide ion can directly electrochemically oxidize metal to form metal oxide. The other, gas-phase transport reaction designated as Path 2, involves generation and consumption of gaseous phase oxygen specie. The reactive interface 18, that converts oxide ions into gaseous phase oxygen species, locates in the vicinity of metal electrode-electrolyte interface. The oxide ion can be initially converted to a gaseous oxygen molecule on a metal electrode, and then further reacts with metal via solid-gas phase mechanism to form metal oxide. In charge mode, the oxygen species, released by reducing metal oxide to metal via electrochemical Path 1 or solid-gas mechanism Path 2, are transported from the metal electrode back to the air electrode.

As one of the key components in a ROB metal electrode, the metal (Me) plays a reservoir role in uptaking or releasing oxygen during discharge-charge cycle via the electrodic reaction of $Me + xO^{2-} \leftrightarrow MeO_x$. The Me in a ROB is selected from Ti, V, Cr, Mn, Fe, Co, Ni, Cu, Mo, Y, and W, preferably Mn, Fe, Mo, and W, more preferably Fe. The metal oxidation kinetics, if controlled by bulk diffusion of active species through dense oxide scale, can be depicted by parabolic law of $(\lambda w)^2 = k_g t$ (eq. 1) where $\lambda$ is weight fraction of oxygen in oxide, W the weight gain per surface area in g/cm$^2$, $k_g$ the parabolic reaction constant in g$^2$/cm$^4$/s, and t the reaction time in s (second). Provided that the surface area of active material is A (cm$^2$/g) and total weight gain of W in gram, then $$w = \frac{W}{A}. \quad \text{(eq. 2)}$$

Combining the above two equations and make derivative W with respect to t, then one yields $$\frac{dW}{dt} = A \frac{\sqrt{k_g}}{2\lambda} \frac{1}{\sqrt[2]{t}}. \quad \text{(eq. 3)}$$

$$\frac{dW}{dt}$$

can then further be mathematically derived into maximum electrical current I (ampere) using the formula of $$I = \frac{NF}{Z}\frac{dW}{dt} = A\frac{nF}{Z}\frac{\sqrt{k_g}}{2\lambda}\frac{1}{\sqrt[2]{t}} \quad \text{(eq. 4)}$$

where n is the number of electrical charges involved in the oxidation reaction, F the Faraday constant of 96485 coulumb/mol, and Z the formula weight of the oxide. Equation 4 clearly suggests that the maximum electrical current I is proportional to A. The larger A, the higher I. Clearly increasing surface area (A) of the active materials emerges as one of leading solutions to enhance overall metal redox reactions and consequently boost cell performance in terms of current during charge-discharge operation for energy storage. Thus, fine iron particles are preferred for ROB application. Unfortunately, directly handling and processing fine metal particles including Fe imposes serious risk due to increasing fire danger with the decreasing size of metal particles. In addition, even if safety measures prudently implemented enable utilization of finer metal powder for example Fe, the loss of surface area of Fe particles at high temperature may lead to the degradation of cell performance of a ROB over an extended period time of operation. The loss of surface area is the consequence of densification and/or coarsening of the materials driven by minimization of its surface energy.

Therefore, there is an urgent need to develop synthesis methods enabling the formation of active materials containing fine Fe particles so that the Fe particles can be handled at a relatively safe manner despite its fairly microscopic size during cell assembly. Also, the fine Fe particles in the materials possess significant resistance against coarsening and densification to preserve its surface area over time at high temperature (600° C.-800° C.).

It is one of the main objects of this invention to provide a solid-solution method for providing Fe-containing active material for use, generally, in a metal electrode of rechargeable oxide-ion battery (ROB) cells.

SUMMARY

The above needs for producing an active material to be used in a metal electrode of a ROB cell are supplied and object accomplished by providing an iron (Fe)-containing specie ($\alpha$) including, but not limited to, oxide, halide, nitrate or carbonate; providing a supporting specie ($\beta$), in the form, but not limited to, of oxide, halide, nitrate or carbonate, containing an element of X, where X is not iron but is selected from Li, Na, K, Mg, Ca, Sr, Ba, Sc, Ti, V, Cr, Mn, Co, Ni, Cu, Al, Ga, Y, Nb, Mo, Ru, W, La, Pr, Nd, Sm, Eu, Gd, Tb, Dy, Ho, Er, Tm, Yb and Lu; preferably, Ca, Sr, Ba, Sc, Ti, V, Mn, Co, Ni, Y, Nb, Ru, W, and La; mixing the iron containing specie ($\alpha$) and the supporting specie ($\beta$) to produce a $\alpha+\beta$ mixture. In this process $\alpha$ and $\beta$ can be in the form of a solid, liquid or solid-liquid mixture and the mixing step can be selected from simply blending, extended milling or a solution mixing approach; subjecting the mixture to a high temperature treatment between 500° C. and 2,500° C., preferably 600° C. to 1800° C., most preferably 800° C. to 1400° C., for a period of time effective to form a solid solution of Fe—X—O between Fe and X, where Fe and X are homogeneously distributed at the microscopic level; and reducing the solid solution, at from 400° C. to 1200° C. in a reducing gas selected from the group consisting of $H_2$—$H_2O$, CO—$CO_2$, $N_2$—$H_2$ and mixtures thereof, to provide metallic Fe "interwoven" with X oxide(s). The term "interwoven" will mean "supported by," "isolated by," "contained by" or "decorated by," as illustrated in FIG. 4(a), (b) or (c). The reduction also causes loss of oxygen in the Fe—X—O and produces porosity in the Fe-containing active material.

The Fe-containing active material can then be optionally compressed and integrated into a metal electrode of a rechargeable oxide-ion battery cell.

BRIEF DESCRIPTION OF THE DRAWINGS

For a better understanding of the invention, reference may be made to the preferred embodiments exemplary of this invention, shown in the accompanying drawings in which.

DESCRIPTION OF THE PREFERRED EMBODIMENT

The requirements of a ROB cell include:
a) an air electrode cathode for reversible conversion of oxygen into an oxide ion that has two electrical charges;
b) an oxide-ion conductive electrolyte for transporting electrical charge;
c) a metal electrode where electrical charge associated with the oxide-ion is stored or released by an active metal component(s), and for accommodating the volume change associated with a metal redox reaction;
d) a reliable seal separating direct contact between air and active metal; and
e) cost effectiveness.

Figure 1:
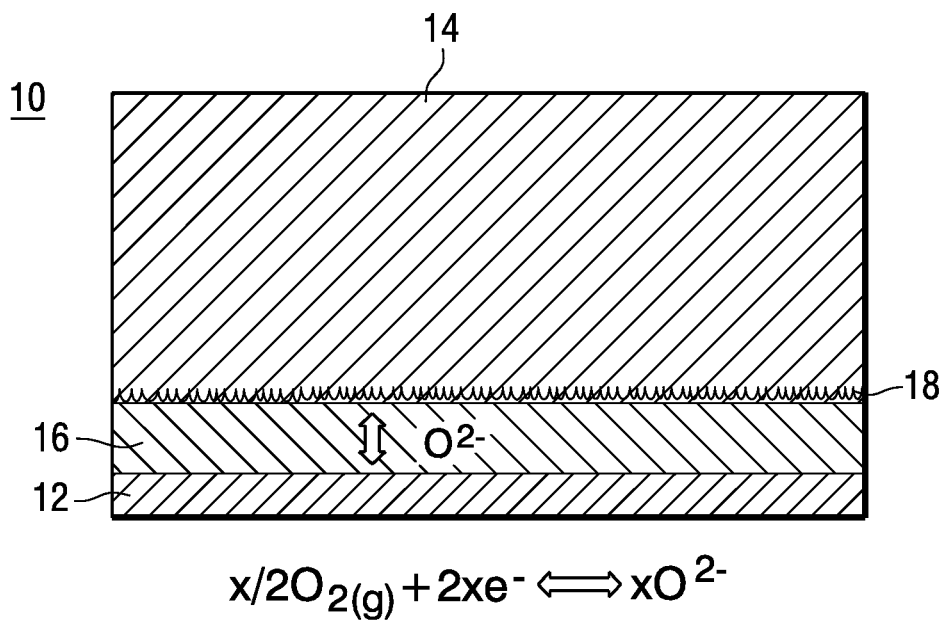
FIG. 1 illustrates the known working principles of a rechargeable oxide-ion battery (ROB) cell.
Figure 2:
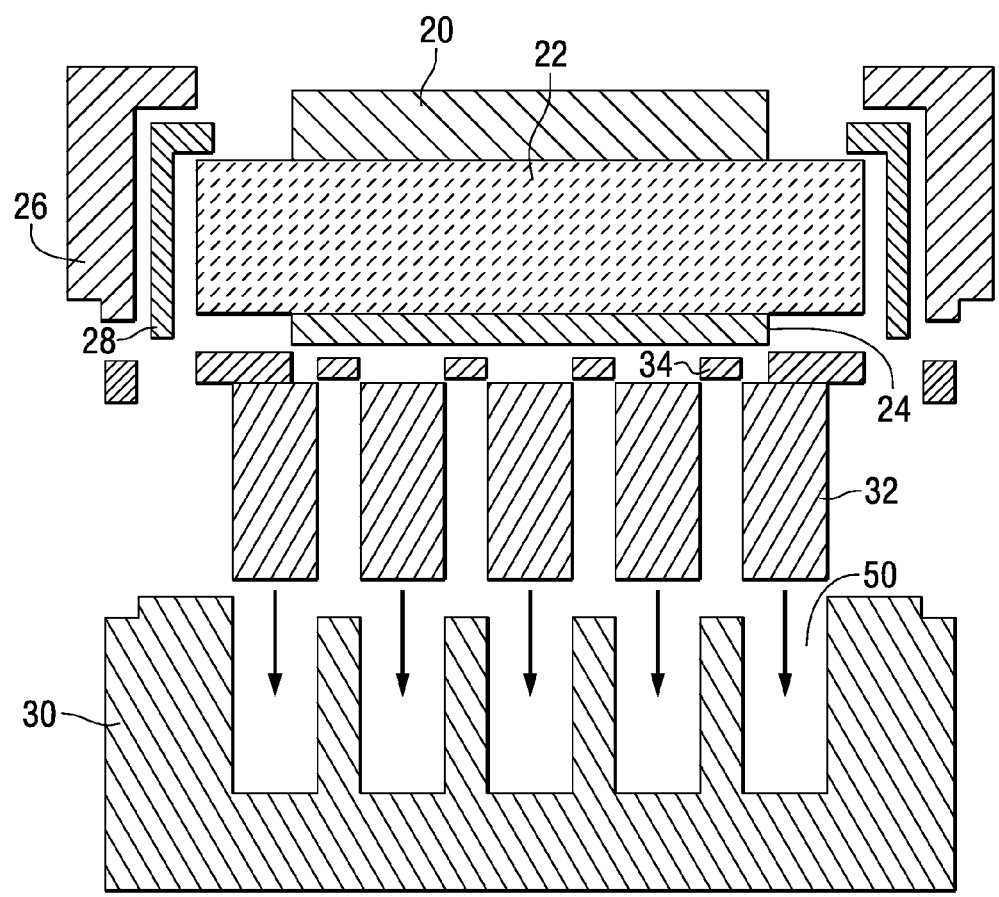
FIG. 2 is a schematic illustration of joining components of one embodiment of a planar ROB cell, showing component arrangement, including a metal electrode.

Referring now to FIG. 2, which shows a schematic illustration of joining components of one embodiment of a planar ROB cell, including a metal electrode, the top air electrode is shown as 20, while 22 shows a sandwiched ceramic middle electrolyte, and 24 shows the bottom metal electrode. Components 20, 22 and 24 together form a membrane assembly. FIG. 2 shows a surrounding metallic frame 26. A seal 28 connects the membrane assembly to the frame 26. A metal housing structure 30 is shown, where active material, for example Fe-containing materials, 32 will fill the metal housing pockets, holes 50. An electrical current connector 34 is shown between the metal housing structure 30 and the bottom metal electrode 24. Other unlabeled seals are also shown.

Figure 3:
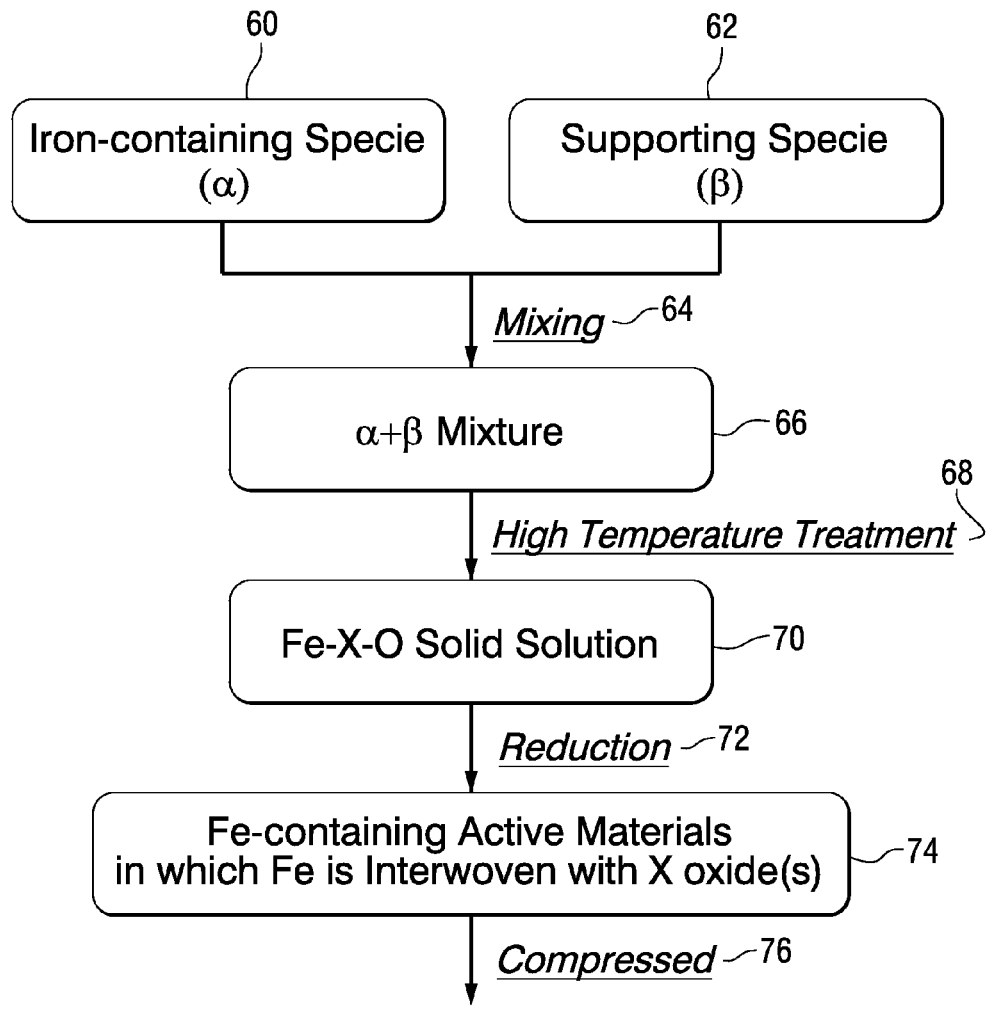
FIG. 3, which best illustrates the invention, is a flow chart of the solid-solution method for producing Fe-containing active materials suitable for ROB cells.

The disclosed invention is described in FIG. 3, which illustrates the solid-solution method for producing Fe-containing active material where Fe particles are decorated by supporting oxide(s), to be used as the active materials in a metal electrode of a ROB cell. As shown in FIG. 3, the process starts with providing a Fe-containing specie ($\alpha$) 60, for example but not limited to, iron halide, nitrate, carbonate, oxide, preferably $Fe_2O_3$; providing a supporting specie ($\beta$), in the form of element X, preferably X oxide, X halides, X nitrate, and X carbonate, where element X selected from Li, Na, K, Mg, Ca, Sr, Ba, Sc, Ti, V, Cr, Mn, Co, Ni, Cu, Al, Ga, Y, Nb, Mo, Ru, W, La, Pr, Nd, Sm, Eu, Gd, Tb, Dy, Ho, Er, Tm, Yb and Lu, preferably in the oxide state. Next, the Fe-containing specie ($\alpha$) are mixed, 64 with a non-iron supporting specie ($\beta$) to produce a $\alpha+\beta$ mixture 66. Mixing is accomplished using blending, milling, or solution techniques.

The mixture 66 is then subjected to high temperature treatment 68 during which Fe and X form solid solution Fe—X—O where Fe and X are thoroughly and homogeneously distributed at the microscopic level. The formed Fe—X—O solid solution is then reduced in an environment where the $Fe^{+2}$ and/or $Fe^{3+}$ in the solid solution 70 is then reduced 72 to particulate metallic Fe interwoven with X oxide (s), 74, having a particle size range of 0.001 micrometers to 100 micrometers, preferably 0.01 micrometers to 10 micrometers. The reduction also generates porosity from 10 vol. % to 70 vol. %, preferably 25 vol. % to 50 vol. %, due to the loss of oxygen bonded to iron ion in the Fe—X—O while X still remains in its oxide state interwoven with the metallic Fe. As a consequence, the densification and coarsening of Fe in the produced Fe-containing active material are mitigated and more surface area is retained Fe at high temperature. The effectiveness of controlling coarsening/densification of Fe species in the active materials likely depends on the amount of X included in the $\alpha+\beta$ mixture. The ratio of X/(X+Fe), in terms of molar number, varies from 0.001 to 0.6, more preferably 0.01 to 0.4. The preferential reduction of Fe in the Fe—X—O solid solution is accomplished by controlling oxygen partial pressure to such a level that the Gibbs free energy of the reaction of Fe—X—O→Fe+X oxide(s)+$O_2$ is negative while Fe—X—O→Fe+metallic X+$O_2$ is positive. Reduction couples, for example $H_2$—$H_2O$, CO—$CO_2$, can be used to establish the above-mentioned oxygen partial pressure by tailoring the ratio between its constituents. The active material 74 can then, optionally, be compressed or formed 76 to provide, for example, an electrode.

EXAMPLE

Barium-Iron Oxide System

The following illustrates the synthesis of materials of interest using glycine nitrate process: Two type materials were made, and one of them was the control and the other the subject. Take the subject as an example. 9.80 g barium nitrate, 136.35 g iron nitrate, and 40.82 g glycine were measured and placed into a 500 ml beaker. Deioned water was added to make ~300 ml stock solution. The stock solution was transferred into a stainless-steel container (2 liters) placed onto a hot plate in a hood with sufficient ventilation. Then a piece of stainless steel screen (200 mesh) was used to cover the opening of the container. The hot plate was then turned on to heat and boil the solution to evaporate excess water. The resulting viscous matter ignited and underwent self-sustaining combustion step. The combusted product was then collected and calcined at 1000° C. for 4 hrs. The calcined powder was then ball milled in iso-propanol using 3 mm yttria-stabilized zirconia media for 18 hrs. The milled material was dried and collected for analytical measurements.

Sample preparation and analytical measurements: ~1 gram powder was placed into a press die with a diameter of 12.75 mm, and was uniaxially pressed under the load of 2000 lbs. The formed, compressed discs were then heated at 900° C. for 6 hrs. in air using a ramping rate of 5° C./min to provide as-prepared samples. Some as-prepared discs were selected for reduction experiment and their diameter (d1) was measured. Then the discs were subjected to reduction in a tubular furnace at 800° C. for 6 hrs. in 95% $N_2$-5% $H_2$ environment with a ramping rate of 5° C./min to generate as-reduced samples. The diameter of as-reduced samples (d2) was measured so that the shrinkage rate ($\delta$) was calculated as $$\delta = 100\left(\frac{d_1 - d_2}{d_1}\right)$$

in percentage. The shrinkage rate ($\delta$) was a strong indicator on the material resistance against densification. The smaller, the higher resistance. The as-prepared and as-reduced samples were subjected to X-ray diffraction analysis using a Rigaku Diffractometer from 2$\theta$ (diffraction angle) of 20° to 80° with a scanning rate of 0.05°/second.

Figure 4:
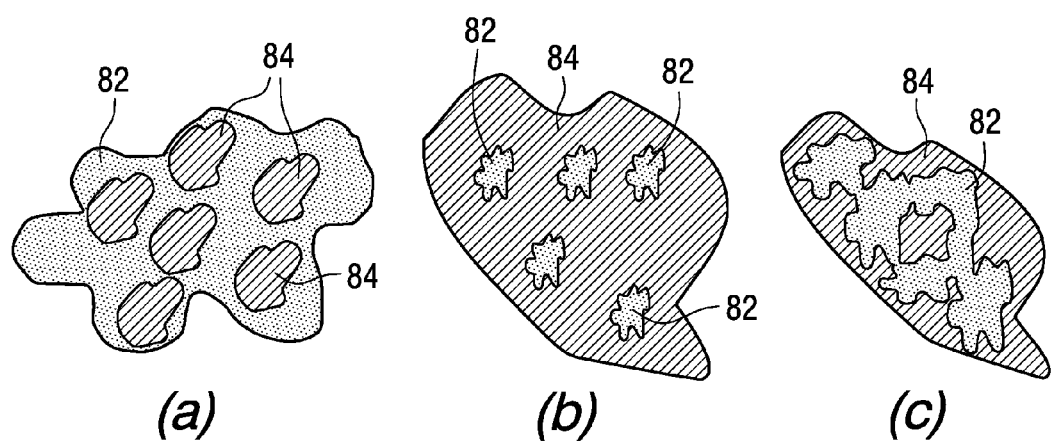
FIG. 4 is a schematic illustration of Fe interwoven with X oxides in three potential scenarios (a), (b) and (c)
Figure 4:
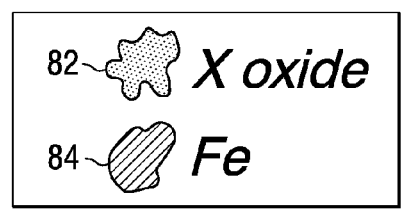

FIGS. 4(*a*), (*b*) and (*c*) shows supporting species X oxide (82) interwoven and interspersed with Fe (84) in three probable scenarios in the distribution of X oxide and Fe.

Figure 5A:
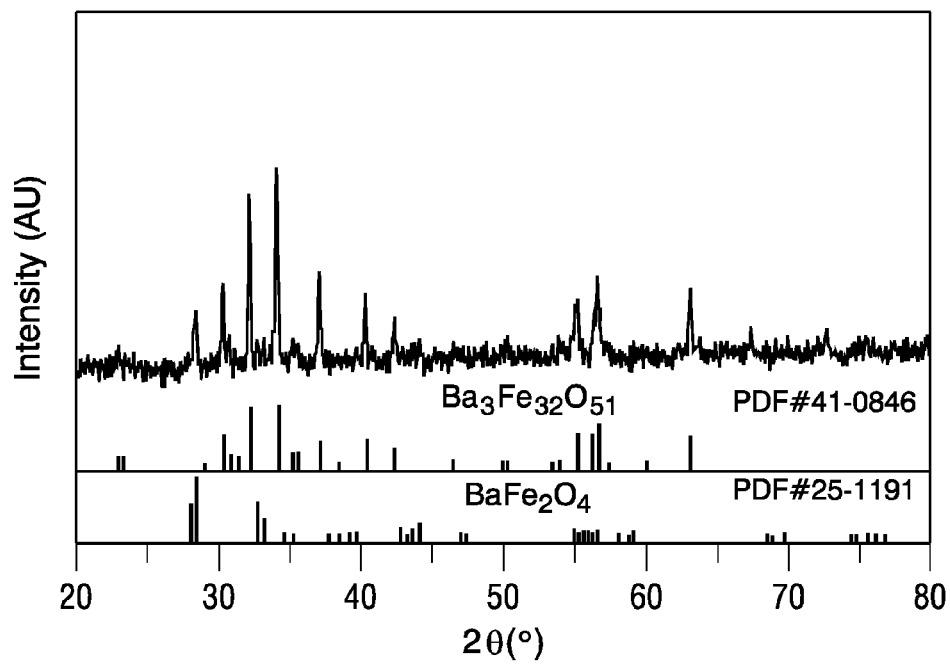
FIG. 5 is the X-ray diffraction patterns of invented (Ba-doped) Fe-containing active material before (a; as-produced) and after (b; as-reduced) reduction at 800° C. for 6 hrs. in 95% $N_2$-5% $H_2$ environment.
Figure 5B:
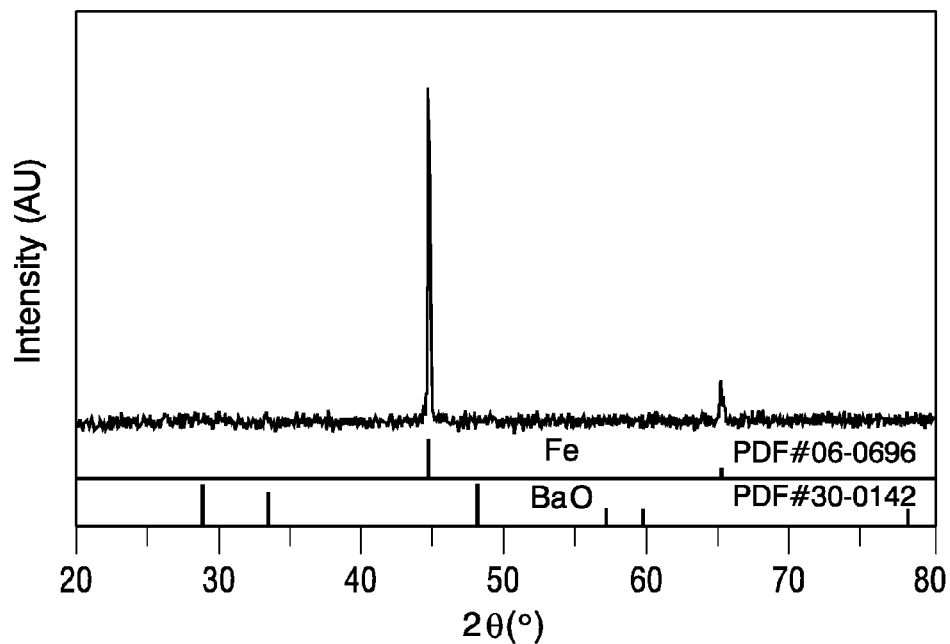

FIG. 5 is the X-ray diffraction patterns of invented (Ba-doped) Fe-containing active material before (a; as-produced) and after (b; as-reduced) reduction at 800° C. for 6 hrs. in 95% $N_2$-5% $H_2$ environment. FIG. 5(A) suggested that the as-produced contained $BaFe_2O_4$ and $Ba_3Fe_{32}O_{51}$ solid solutions. Upon the reduction, the solid solutions were reduced into metallic Fe as shown in FIG. 5(B). No characteristic peak related to any barium oxide in the spectrum implied that the presence of barium oxide in the reduced sample was lacking of long-range order, the phenomenon observed in Ba—Ni—O system where BaO nanosized islands were observed on the surface of metallic Ni.

The similar phenomenon might exist in the reduced Ba—Fe—O system.

Figure 6:
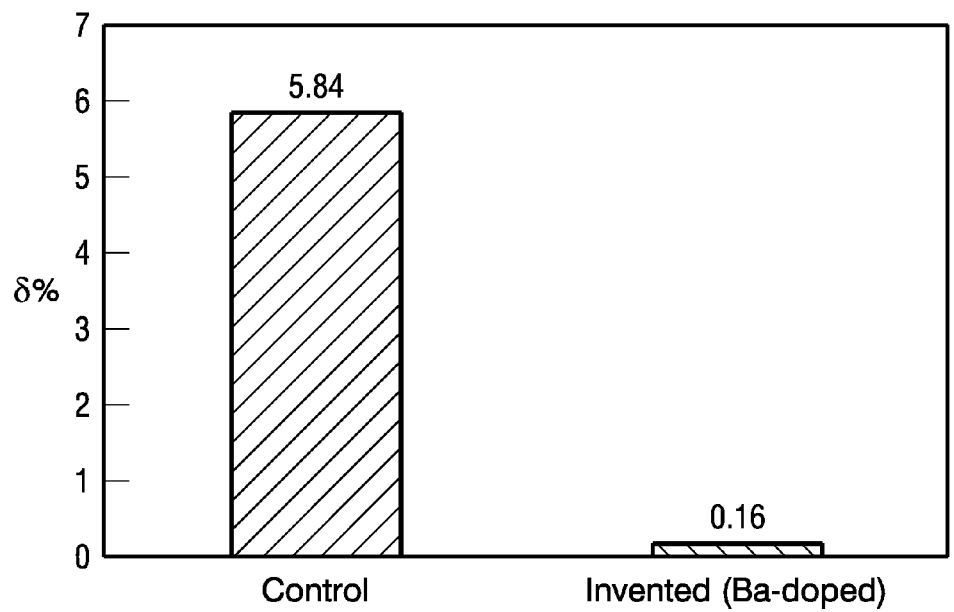
FIG. 6 is the shrinkage rate for the control and invented (Ba-doped) Fe-containing active materials upon reduction at 800° C. for 6 hrs. in 95% $N_2$-5% $H_2$ environment.

FIG. 6 is the shrinkage rate $\delta$% for the control and invented (Ba-doped) Fe-containing active materials upon reduction at 800° C. for 6 hrs. in 95% $N_2$-5% $H_2$ environment. Upon reduction, the control shrank $\delta$% for 5.84%, while the subject (the invented one) merely withered $\delta$% for 0.16%. A spectacular result. Including barium compound into the Fe-containing active materials via the invented solid-solution method significantly alleviated the densification/coarsening of the active material.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A solid-solution method for producing an iron-containing active material to be used in a metal electrode of a rechargeable oxide-ion battery cell comprising the steps:
   i) providing iron-containing specie ($\alpha$);
   ii) providing supporting specie ($\beta$) containing an element of X, where X is not iron;
   iii) mixing the Fe-containing specie ($\alpha$) and the supporting specie ($\beta$) to produce a $\alpha+\beta$ mixture;
   iv) subjecting the mixture to a high temperature treatment for a period of time effective to produce a solid solution of Fe—X—O, where Fe and X are homogeneously distributed at the microscopic level; and v) reducing the solid solution of Fe—X—O to provide metallic Fe interwoven with X oxide(s), where the reduction causes loss of oxygen to produce porous Fe-containing active material.

2. The method of claim 1, wherein the Fe-containing specie ($\alpha$) of step i is in the form of solid, liquid, or solid-liquid mixture.

3. The method of claim 1, wherein the supporting specie ($\beta$) of step ii is in the form of solid, liquid, or solid-liquid mixture.

4. The method of claim 1, wherein the supporting specie ($\beta$) of claim 3 is selected from X oxide, X halide, X nitrate, and X carbonate.

5. The method of claim 1, wherein the supporting specie ($\beta$) contains element X selected from the group consisting of Li, Na, K, Mg, Ca, Sr, Ba, Sc, Ti, V, Cr, Mn, Co, Ni, Cu, Al, Ga, Y, Nb, Mo, Ru, W, La, Pr, Nd, Sm, Eu, Gd, Tb, Dy, Ho, Er, Tm, Yb and Lu.

6. The method of claim 1, wherein the supporting species ($\beta$) containing element X is selected from the group consisting of Ca, Sr, Ba, Sc, Ti, V, Mn, Co, Ni, Y, Nb, Ru, W, and La.

7. The method of claim 1, wherein the ratio of X/(X+Fe), in terms of molar number, varies from 0.001 to 0.6.

8. The method of claim 1, wherein mixing the Fe-containing specie ($\alpha$) and the supporting specie ($\beta$) of step iii comprises at least one of blending, milling, and solution approaches.

9. The method of claim 1, wherein the high temperature treatment of step iv is conducted in the temperature between 500° C. and 2,500° C.

10. The method of claim 1, wherein the reducing environment of step v involves heating at the temperatures between 400° C. and 1200° C. in a reducing gas selected from $N_2$—$H_2$, $H_2$—$H_2O$, CO—$CO_2$, and mixtures thereof.

11. The method of claim 10, wherein the final, reduced Fe particle size ranges from 0.001 micrometers to 100 micrometers.

12. The method of claim 10, wherein the final porosity of the Fe-containing material in step v is from 10 vol. % to 70 vol. %, preferably 25 vol. % to 50 vol. %.

\* \* \* \* \*